No. 829,299. PATENTED AUG. 21, 1906.
C. SKIDMORE.
WEIGHING MECHANISM.
APPLICATION FILED JAN. 16, 1905.
2 SHEETS—SHEET 1.
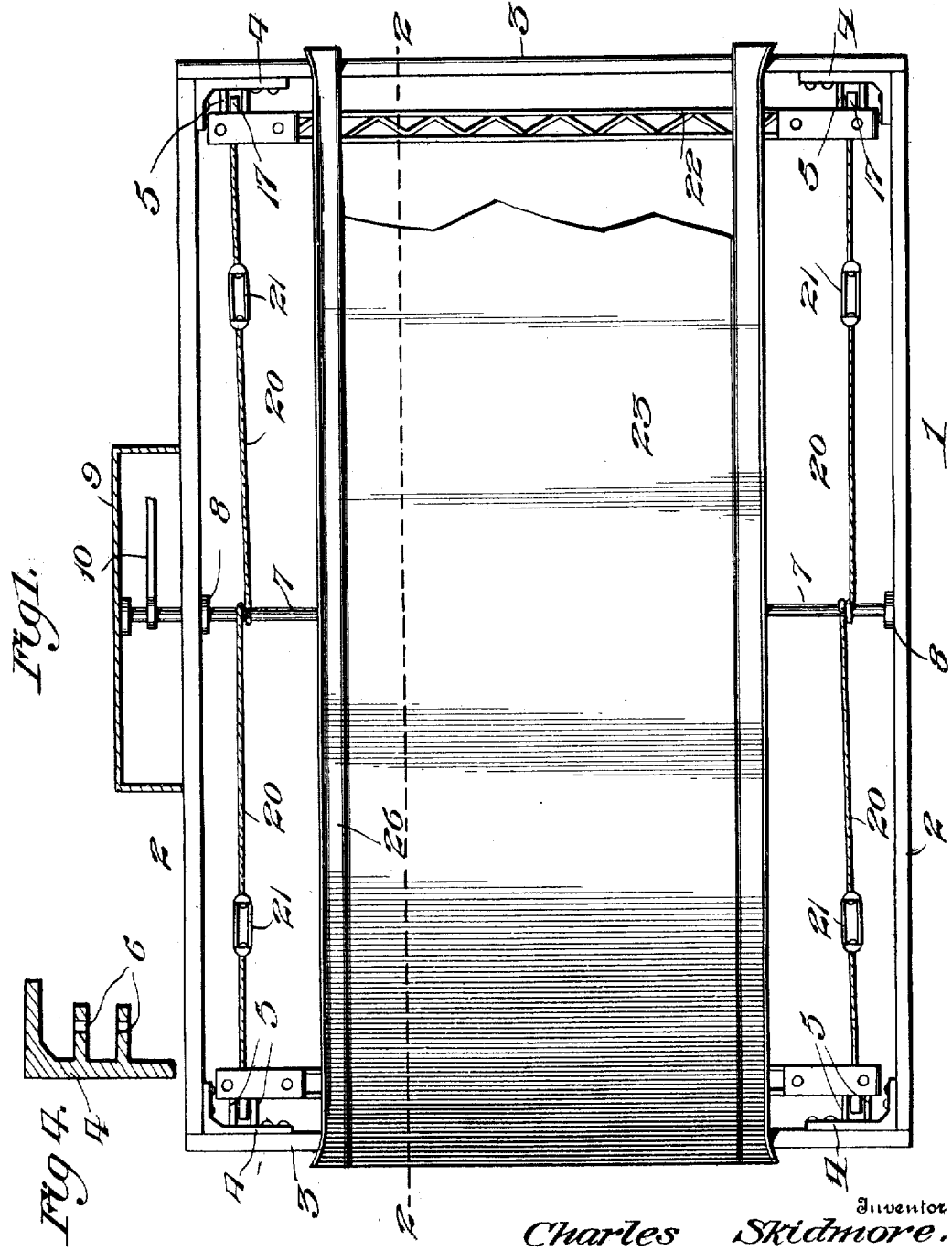
Witnesses
Phil E. Barnes,
Katharine Allen.
Inventor
Charles Skidmore.
By Victor J. Evans
Attorney

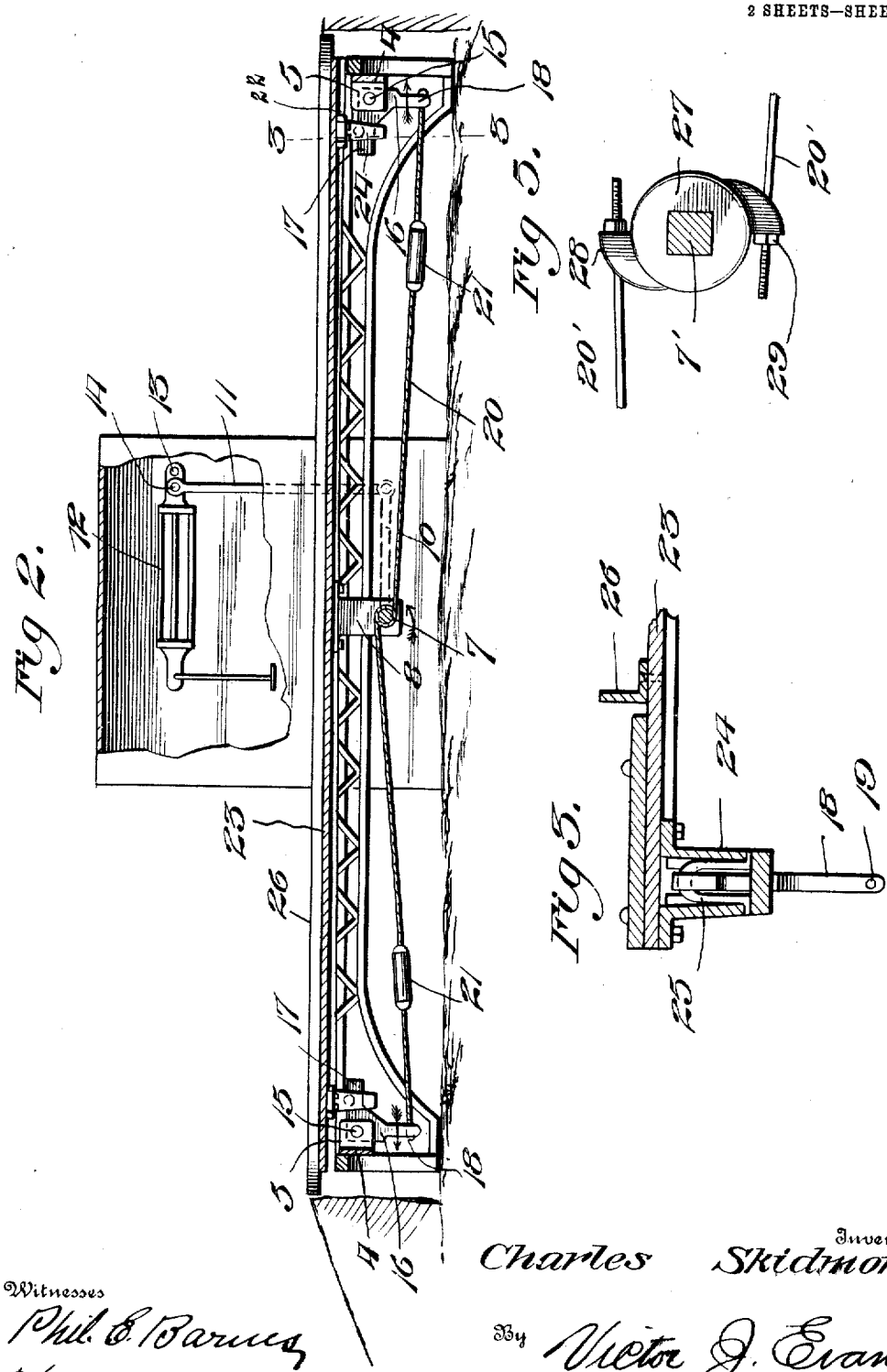

UNITED STATES PATENT OFFICE.

CHARLES SKIDMORE, OF HOMER, NEBRASKA.

WEIGHING MECHANISM.

No. 829,299.      Specification of Letters Patent.      Patented Aug. 21, 1906.

Application filed January 16, 1905. Serial No. 241,361.

*To all whom it may concern:*

Be it known that I, CHARLES SKIDMORE, a citizen of the United States, residing at Homer, in the county of Dakota and State of Nebraska, have invented new and useful Improvements in Weighing Mechanism, of which the following is a specification.

This invention relates to weighing-machines, and has for its objects to produce a simple inexpensive device of this character which may be readily transported from place to place and set up for use, one wherein the weight of the device as a whole is reduced to a minimum, and one in which the scale-beam will during the weighing operation be positively lifted, as distinguished from constructions in which the weight-beam is actuated by depression.

Further objects of the invention are to provide simple and efficient devices for yieldably supporting the depressible platform and novel connections between said devices and the power-shaft, these connections including adjusting means whereby the weighing mechanism may be accurately adjusted.

To these ends the invention comprises the novel features of construction and combination of parts more fully hereinafter described.

In the accompanying drawings, Figure 1 is a top plan view of a scale embodying the invention. Fig. 2 is a vertical longitudinal sectional elevation, the section being taken on the line 2 2 of Fig. 1. Fig. 3 is a detail sectional elevation, on an enlarged scale, taken on the line 3 3 of Fig. 2. Fig. 4 is a horizontal section through one of the frame-brackets. Fig. 5 is a detail sectional elevation illustrating a modified form of connection.

Referring to the drawings, 1 designates a frame of substantially rectangular form in plan comprising side bars 2 and end bars 3, there being bolted or otherwise secured in the corners of the frame horizontal brackets 4, each formed with a pair of spaced horizontal portions or arms 5, provided with alining bearing-openings 6.

Extended transversely through and at the longitudinal center of the frame 1 is a power-shaft 7, journaled for rotation in bearings or hangers 8, attached to the side bars 2, this shaft being extended at one side of the frame transversely through and adjacent the bottom of a vertical casing 9, while upon the shaft within the casing there is fixed a normally horizontal lever 10, connected at its outer end by means of a link 11 with a weight-beam 12 of the usual or any appropriate construction. Attention is directed to the fact that the beam is fulcrumed adjacent one end, as at 13, and that the upper end of the link 11 is pivoted to the beam at 14 immediately in advance of the fulcrum 13 for a purpose which will hereinafter appear.

Each bracket 4 has pivoted thereto between its pair of spaced arms 5 and by means of a pintle 15, seated in the opening 6, one of a series of actuating members 16 in the form of a bell-crank lever having a normally horizontal arm or portion 17 and a vertical arm or portion 18, these members, which correspond in number to the number of brackets, being arranged in opposite pairs and having their arms 18 perforated adjacent their lower ends, as at 19, for the reception of the adjacent ends of connecting elements 20, preferably in the form of wire cables, likewise arranged in pairs and having their inner ends reversely wound upon and attached to the power-shaft 7, as illustrated in Figs. 1 and 2. Each of the elements 20 includes an adjusting member 21, preferably in the form of a turnbuckle arranged within and between the ends of the cable, these turnbuckles being operable for adjusting the tension of the elements.

Supported by the actuating member 16 at opposite ends of the frame are transverse bolsters 22, which in turn receive and support a platform 23, there being attached to the lower faces of the bolsters hangers 24 in the form of substantially U-shaped frames, each having pivoted therein an inverted-U-shaped link 25, engaged with and near the outer end of the arm 17 of the adjacent bell-crank 16, while upon the platform 23 is arranged a pair of parallel longitudinal tracks 26 on which the wheels of the vehicle may travel.

In practice when a load is arranged upon the platform 23 the latter will be depressed, thus depressing the outer ends of the arms 17 and rocking the actuating members 16 upon their pivots, thereby swinging the lower ends of their vertical arms in reverse directions, as indicated by the arrows in Fig. 2, and exerting traction upon the elements 20 for rotating the power-shaft 7 in the direction indicated by the arrow in said figure. When the shaft is thus rotated, the outer end of lever 10 will move upward and through the medium of link 11 lift the scale-beam 12 and of course the weights carried thereby. It is to be particularly observed that under this construction the platform will be yieldably sustained wholly by the actuating members 16 and that movement of the latter through the medium of the platform exerts a direct pull upon the elements 20 for rotating the shaft, while the latter will through the intermediate connections positively lift the scale-beam. Further, it is to be noted that any inaccuracies in the weighing mechanism may be readily corrected by manipulating the adjusting devices 21 to vary the tension of the elements 20 and that owing to the simplicity of the construction the weight of the scale as a whole may be measurably reduced as compared with such devices now in use, thus adapting the mechanism for ready transportation from place to place and to be set up for use.

In Fig. 5 I have illustrated the shaft 7' as being of square or other non-circular form in cross-section and having mounted thereon a head 27, provided with oppositely-disposed slotted portions or lugs 28 with which are engaged, respectively, the ends of rods or other rigid connecting elements 20', the outer ends of the latter being adapted for engagement with the arms 18 of the bell-cranks, as heretofore explained. The rods 20' at their point of connection with the lugs 28 are threaded throughout a suitable portion of their length for the reception of nuts 29, which may obviously be manipulated to vary the tension of the rods. In other respects the construction and operation of the parts is identical with that above described.

From the foregoing it is apparent that I produce a simple inexpensive device which in practice will efficiently perform its functions to the attainment of the ends in view, it being understood that minor changes in the details herein set forth may be resorted to without departing from the spirit of the invention.

Having thus fully described the invention, what is claimed as new is—

1. In a weighing mechanism, a scale-beam, pivoted bell-crank levers, a depressible platform sustained by said levers, a rotary power-shaft, connections between the levers and shaft for rotating the latter when the platform is depressed, and operative connections between the shaft and beam for lifting the latter when the shaft is rotated.

2. In a weighing mechanism, a scale-beam, pivoted bell-crank levers, a depressible platform sustained thereby, a rotary power-shaft, operative connections between the levers and power-shaft for rotating the latter when the platform is depressed, an arm fixed for movement with the shaft, and a link connecting the arm and beam for positively raising the latter when the shaft is rotated.

3. In a weighing mechanism, a pivoted scale-beam, a plurality of pivoted bell-crank levers, a depressible platform sustained by the levers, a rotary power-shaft, operative connections between the levers and shaft for rotating the latter when the platform is depressed, an arm fixed for movement with the shaft, and a link connected with the arm and engaged with the beam at a point in advance of the fulcrum of the latter.

In testimony whereof I affix my signature in presence of two witnesses.

CHARLES SKIDMORE.

Witnesses:
JAMES NELSON,
HARRIET CAIN.